US012516435B2

(12) United States Patent
Kato et al.

(10) Patent No.: US 12,516,435 B2
(45) Date of Patent: Jan. 6, 2026

(54) COMPOSITE MATERIAL, METHOD FOR PRODUCING COMPOSITE MATERIAL, AND TERMINAL

(71) Applicant: DOWA METALTECH CO., LTD., Tokyo (JP)

(72) Inventors: Yukiya Kato, Tokyo (JP); Hirotaka Takahashi, Tokyo (JP); Tatsuhiro Doi, Tokyo (JP); Hirotaka Kotani, Tokyo (JP); Takao Tomiya, Tokyo (JP); Hiroto Narieda, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 39 days.

(21) Appl. No.: 17/923,692

(22) PCT Filed: Apr. 21, 2021

(86) PCT No.: PCT/JP2021/016170

§ 371 (c)(1),
(2) Date: Nov. 7, 2022

(87) PCT Pub. No.: WO2021/261066

PCT Pub. Date: Dec. 30, 2021

(65) Prior Publication Data

US 2023/0175160 A1 Jun. 8, 2023

(30) Foreign Application Priority Data

Jun. 23, 2020 (JP) ................................ 2020-107543

(51) Int. Cl.

*H01B 1/02* (2006.01)
*C25D 3/46* (2006.01)
*C25D 7/00* (2006.01)
*C25D 15/00* (2006.01)

(52) U.S. Cl.

CPC ............... *C25D 15/00* (2013.01); *C25D 3/46* (2013.01); *C25D 7/00* (2013.01); *H01B 1/026* (2013.01)

(58) Field of Classification Search

None
See application file for complete search history.

(56) References Cited

U.S. PATENT DOCUMENTS

| | | | | |
|---|---|---|---|---|
| 7,514,022 | B2 * | 4/2009 | Miyazawa ............ | C25D 15/02 205/148 |
| 2003/0024822 | A1 | 2/2003 | Steinius | |
| 2005/0282006 | A1 | 12/2005 | Miyazawa et al. | |
| 2006/0024430 | A1 | 2/2006 | Yau et al. | |
| 2007/0007497 | A1 | 1/2007 | Miyazawa et al. | |
| 2009/0159451 | A1 | 6/2009 | Tomantschger et al. | |
| 2011/0256356 | A1 * | 10/2011 | Tomantschger ......... | C25D 5/10 977/734 |
| 2013/0196174 | A1 * | 8/2013 | Zhang-Beglinger ...... | C22C 5/06 428/647 |
| 2015/0184307 | A1 | 7/2015 | Hosokawa et al. | |
| 2016/0212836 | A1 | 7/2016 | Arai et al. | |
| 2021/0156044 | A1 | 5/2021 | Takagi | |

FOREIGN PATENT DOCUMENTS

| | | | |
|---|---|---|---|
| EP | 3 300 808 | A1 | 4/2018 |
| JP | 61-195985 | A | 8/1986 |
| JP | 61-195986 | A | 8/1986 |
| JP | 2-270984 | | 11/1990 |
| JP | 3054628 | B2 | 4/2000 |
| JP | 2006-37225 | A | 2/2006 |
| JP | 2007-262528 | A | 10/2007 |
| JP | 2008-88491 | A | 4/2008 |
| JP | 4806808 | B2 | 8/2011 |
| JP | 5848168 | B2 | 12/2015 |
| JP | 2016-166396 | A | 9/2016 |
| KR | 10-1928641 | B1 | 12/2018 |
| TW | 201518078 | A | 5/2015 |
| WO | 2014/020981 | A1 | 2/2014 |
| WO | 2019/117279 | A1 | 6/2019 |

OTHER PUBLICATIONS

Extended European Search Report that issued in European Patent Application No. 21830125.7, dated Aug. 10, 2024.
International Search Report Issued in International Patent Application No. PCT/JP2021/016170, dated Jul. 6, 2021, along with an English translation thereof.
International Preliminary Report on Patentability issued in International Patent Application No. PCT/JP2021/016170, dated Dec. 13, 2022, along with an English translation thereof.
Translation of Jan. 7, 2025, Office Action and Partial Translation of Search Report that issued in Chinese Patent Application No. 202180044060.1.
Dai Dahuang (Ed.) et al., *Functional thin films and their deposition preparation Technology*, Beijing: Metallurgical Industry Press, Jan. 31, 2013, reference p. 153, ISBN 978-7-5024-6026-6 (Concise Statement of relevance being satisfied by the submission of an English-language version of the Jan. 7, 2025 Office Action/search report, which indicates that this reference is an "A" reference).
Yang Naiheng (Ed.) et al., *Vacuum coating technology for curtain wall glass*, Northeast University Press, Nov. 30, 1994, reference p. 156, Isbn 7-81006-892-X (Concise Statement of relevance being satisfied by the submission of an English-language version of the Jan. 7, 2025 Office Action/search report, which indicates that this reference is an "A" reference).

* cited by examiner

*Primary Examiner* — Adam Krupicka
(74) *Attorney, Agent, or Firm* — GREENBLUM & BERNSTEIN, P.L.C.

(57) ABSTRACT

A composite material including a composite film formed on a base material, the composite film including a silver layer containing carbon particles, wherein a content of Sb in the composite film is 1 mass % or less, and a crystallite size of silver in the composite film is 40 nm or less.

14 Claims, No Drawings

COMPOSITE MATERIAL, METHOD FOR PRODUCING COMPOSITE MATERIAL, AND TERMINAL

TECHNICAL FIELD

The present invention relates to a composite material including a predetermined composite film formed on a base material, and a production method thereof. More particularly, the present invention relates to a composite material used as a material for sliding contact parts such as switches and connectors, and a production method thereof.

BACKGROUND ART

Conventionally, as a material for sliding electric contact parts such as switches and connectors, a silver (Ag) plated material has been used which is a conductive base material such as copper (Cu) or a copper alloy plated with silver in order to prevent oxidation of the conductive base material due to heating during a sliding process.

However, silver-plating suffers from a problem of being easily peeled off due to sliding because it is soft, easily worn, and generally has high friction coefficient. In order to solve this problem, there is proposed a method for forming a composite material film on a conductive base material by electroplating to improve the wear resistance, wherein the composite material film contains graphite particles, among carbon particles having good heat resistance, wear resistance, lubricating ability and the like such as graphite particles and carbon black particles, dispersed in a silver matrix (see, e.g., Patent Documents 1 and 2).

Patent Document 3 discloses a silver plated material excellent in heat resistance, wear resistance, and bending workability, which includes a first silver plating layer with a specific crystal orientation and a second silver plating layer with a Vickers hardness Hv of 140 or more, formed on a base material in this order. The second silver plating layer is formed by electroplating using a silver-plating solution to which antimony (Sb) is added.

CITATION LIST

Patent Document

Patent Document 1: Japanese Patent No. 3054628
Patent Document 2: Japanese Patent No. 4806808
Patent Document 3: Japanese Patent No. 5848168

SUMMARY OF INVENTION

Solution to Problem

However, a silver plated material disclosed in Patent Documents 1 and 2 which includes a silver plating layer formed on a base material, the silver plating layer containing graphite particles dispersed in a silver matrix, may be insufficient for practical use in some cases although it is excellent in wear resistance compared to a silver plated material which includes a silver plating layer formed on a base material, the silver plating layer containing no graphite particles. In the present invention, wear resistance means satisfying that the composite material itself is less likely to be worn by sliding, as well as that the composite material is less likely to wear a wear opponent material. The reason is as follows. In the sliding electric contact part or the like, the sliding opponent material of the composite material is often made of a sliver plated material or the like. Accordingly, the performance of the opponent material will be deteriorated when the composite material wears the opponent material, even though the composite material itself is not worn.

Further, the silver plating layer containing antimony disclosed in Patent Document 3 has high hardness, and is more excellent in wear resistance than pure silver, but fails to satisfy the requirements in the art. Furthermore, the silver plating layer generates antimony oxide when kept at high temperature, resulting in increased contact resistance (i.e., insufficient heat resistance).

Therefore, in view of these conventional problems, an object of the present invention is to provide a composite material excellent in wear resistance and heat resistance which includes a composite film formed on a base material, the composite film containing carbon particles in a silver layer.

Means for Solving the Problem

The present inventors have studied intensively to solve the above problems. The second silver plating layer disclosed in Patent Document 3 is formed by electroplating using a silver-plating solution to which antimony is added. Perhaps owing to the effect of such antimony, the crystallite size of thus formed second silver plating layer has been found to be small, which presumably attain high hardness and lead to a certain degree of wear resistance.

However, the silver layer containing antimony has a problem in terms of heat resistance as described above, and the present inventors considered creating a silver layer (hereinafter also referred to as an AgC layer) without using antimony, the silver layer having high hardness, being excellent in wear resistance, and containing carbon particles.

As a result of various studies on the formation conditions of an AgC layer, it was found that by performing electroplating with a silver-plating solution containing specific components, an AgC layer having small crystallite size, and hence high hardness, excellent wear resistance, and excellent heat resistance can be formed without using antimony. Although the reason is not clear, this AgC layer is more excellent in wear resistance than a silver plated material including a silver plating layer containing antimony disclosed in Patent Document 3. In this way, the present inventors have completed the present invention.

The present invention will be hereinafter explained.

[1] A composite material including a composite film formed on a base material, the composite film including a silver layer containing carbon particles, wherein a content of Sb in the composite film is 1 mass % or less, and a crystallite size of silver in the composite film is 40 nm or less.

[2] The composite material according to [1], wherein the content of Sb in the composite film is 0.1 mass % or less.

[3] The composite material according to [1] or [2], wherein a percentage of the surface of the composite film occupied by the carbon particles is 1 to 80 area %.

[4] The composite material according to any one of [1] to [3], wherein the crystallite size of silver in the composite film is 2 to 30 nm.

[5] The composite material according to any one of [1] to [4], wherein a thickness of the composite film is 0.5 to 45 μm.

[6] The composite material according to any one of [1] to [5], wherein a content of carbon in the composite film is 1 to 50 mass %.

[7] The composite material according to any one of [1] to [6], wherein the base material is constituted by Cu or a Cu alloy.

[8] The composite material according to any one of [1] to [7], wherein the Vickers hardness Hv of the composite film is 100 or more.

[9] A method for producing a composite material, including performing electroplating in a silver-plating solution containing carbon particles to form a composite film including a silver layer containing carbon particles on a base material, wherein a content of antimony (Sb) in the silver-plating solution is 1 g/L or less, and the silver-plating solution contains a compound A represented by the following general formula (I):

[Chem. 1]

General formula (I)

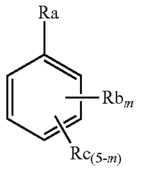

(in the formula (I), m is an integer from 1 to 5,

Ra is a carboxyl group,

Rb is an aldehyde group, a carboxyl group, an amino group, a hydroxyl group, or a sulfonate group, Rc is hydrogen or an arbitrary substituent, when m is 2 or more, a plurality of Rb may be the same or different from each other, when m is 3 or less, a plurality of Rc may be the same or different from each other, Ra and Rb may be each independently bound to a benzene ring via a divalent group constituted by at least one selected from the group consisting of —O— and —$CH_2$—).

[10] The method for producing a composite material according to [9], wherein the silver-plating solution contains substantially no cyanide.

[11] The method for producing a composite material according to [9] or [10], wherein the silver-plating solution contains a compound having a sulfonate group.

[12] The method for producing a composite material according to any one of [9] to [11], wherein the base material is constituted by copper (Cu) or a Cu alloy.

[13] The method for producing a composite material according to any one of [9] to [12], wherein the carbon particles are graphite particles having a volume-based cumulative 50% particle size (D50) of 0.5 to 15 μm measured with a laser diffraction/scattering particle size distribution measuring device.

[14] A terminal in which the composite material according to any one of [1] to [8] is used as a constituent material thereof.

Advantageous Effects of Invention

According to the present invention, there are provided a composite material which is excellent in wear resistance and heat resistance, and includes a composite film formed on a base material, the composite film containing carbon particles in a silver layer, and a method for production thereof.

DETAILED DESCRIPTION OF THE INVENTION

Embodiments of the present invention will be described hereafter.

[Method for Producing Composite Material]

An embodiment of the method for producing a composite material of the present invention is a method for producing a composite material including performing electroplating in a specific silver-plating solution containing carbon particles to form a composite film on a base material, the composite film containing carbon particles in a silver layer. Constituents of the method for producing the composite material will be hereinafter explained.

<<Base Material>>

As a constituent material of the base material on which the composite film is formed, those which can be plated with silver and have electrical conductivity required for sliding contact parts such as switches and connectors are preferred. Further, from a viewpoint of cost, Cu (copper) and Cu alloys are preferred as the constituent material. Alloys constituted by Cu, at least one selected from the group consisting of Si (silicon), Fe (iron), Mg (magnesium), P (phosphorus), Ni (nickel), Sn (tin), Co (cobalt), Zn (zinc), Be (beryllium), Pb (lead), Te (tellurium), Ag (silver), Zr (zirconium), Cr (chromium), Al (aluminum), and Ti (titanium), and inevitable impurities are preferred as the above-described Cu alloys from a viewpoint of compatibility between electrical conductivity and wear resistance. The amount of Cu in the Cu alloy is preferably 85 mass % or more, more preferably 92 mass % or more (the amount of Cu is preferably 99.95 mass % or less).

As will be described below, the base material is used preferably in an application for terminals (as a composite material with the composite film formed thereon). In this event, the base material itself may be in the shape for the application, or the base material has a flat shape (flat plate-like shape, etc.) and may be shaped for the application after being made into a composite material.

<<Electroplating>>

In the method for producing a composite material of the present invention, electroplating is performed on the base material described above in a specific silver-plating solution to form a composite film on a base material, the composite film containing carbon particles in a silver layer.

<Silver-Plating Solution>

The silver-plating solution contains silver ions, a specific compound A, and carbon particles, and has a content (concentration) of Sb (antimony) of 1 g/L or less.

(Silver Ion)

The silver-plating solution contains silver ions. The concentration of silver in the silver-plating solution is preferably 5 to 150 g/L, more preferably 10 to 120 g/L, and most preferably 20 to 100 g/L, from the viewpoints of formation rate of the composite film and suppression of uneven appearance of the composite film.

(Compound A)

The compound A is represented by the following general formula (I):

[Chem. 2]

General formula (I)

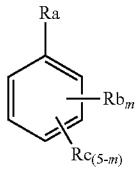

In the formula (I), m is an integer from 1 to 5, Ra is a carboxyl group, Rb is an aldehyde group, a carboxyl group, an amino group, a hydroxyl group, or a sulfonate group, Rc is hydrogen or an arbitrary substituent, Ra and Rb may be each independently bound to a benzene ring via a divalent group composed of at least one selected from the group consisting of —O— and $—CH_2—$. Examples of the divalent group include $—CH_2—CH_2—O—$, $—CH_2—CH_2—CH_2—O—$, and $(—CH_2—CH_2—O—)_n$ (n is an integer of 2 or more).

The compound A is considered to be adsorbed on the surface of the deposited silver to suppress silver crystals from growing so that the crystallite size of silver in the composite film formed by electroplating is reduced. As a result, a composite material having excellent hardness and hence excellent wear resistance can be obtained without using Sb.

In the above general formula (I), when m is 2 or more, a plurality of Rb may be the same or different from each other, and when m is 3 or less, a plurality of Rc may be the same or different from each other. Regarding Rc, examples of the "arbitrary substituent" include a $C_{1-10}$ alkyl group, an alkylaryl group, an acetyl group, a nitro group, a halogen group, and a $C_{1-10}$ alkoxyl group.

The concentration of the compound A in the silver-plating solution is preferably 2 to 250 g/L, and more preferably 3 to 200 g/L, from the viewpoints of suppression of uneven appearance of the composite film and appropriate control of the crystallite size of silver in the composite film that is formed.

In addition to the compound A, a compound that is adsorbed on the surface of the deposited silver to suppress silver crystals from growing so that the crystallite size of silver in the composite film formed by electroplating is reduced, that is, a compound that inhibits the growth of the crystallite size may be used.

(Carbon Particles)

The silver-plating solution contains carbon particles. With the silver-plating solution containing carbon particles, the carbon particles get caught in the silver matrix when the composite film (silver plating film) is formed on the base material by electroplating. When the composite film contains the carbon particles, the wear resistance and the heat resistance of the composite material are enhanced. From the viewpoint of developing such functions, the carbon particles are preferably graphite particles. A volume-based cumulative 50% particle size (D50) of the carbon particles measured with a laser diffraction/scattering particle size distribution measuring device is preferably 0.5 to 15 μm, and more preferably 1 to 10 μm, from the viewpoint of easily getting caught into the silver plating film. Furthermore, the shape of the carbon particle is not particularly limited, and includes approximately spherical, scale-like, and irregular shapes, but is preferably a scale-like shape because the composite film surface can be smoothened, thereby enhancing the wear resistance of the composite material.

Moreover, it is preferable to remove the lipophilic organics adsorbed on the surface of the carbon particles by oxidation treatment of the carbon particles. Examples of the lipophilic organics include aliphatic hydrocarbons such as alkanes and alkenes, and aromatic hydrocarbons such as alkylbenzenes. As the oxidation treatment of the carbon particles, wet oxidation treatment as well as dry oxidation treatment using $O_2$ gas or the like can be used. However, from the viewpoint of mass production, it is preferable to use the wet oxidation treatment. The carbon particles having a large surface area can be uniformly treated by the wet oxidation treatment. As the wet oxidation treatment method, a method can be used in which the carbon particles are suspended in water and then an appropriate amount of an oxidizing agent is added. The oxidizing agent such as nitric acid, hydrogen peroxide, potassium permanganate, potassium persulfate, or potassium perchlorate can be used. It is considered that the lipophilic organics adhering to the carbon particles are oxidized by the added oxidizing agent into a form readily soluble in water, and appropriately removed from the surface of the carbon particles. After this wet oxidation treatment, performing filtration and further washing the carbon particles with water can further enhance the effect of removing lipophilic organics from the surface of the carbon particles. Oxidation treatment of the carbon particles can remove lipophilic organics such as aliphatic hydrocarbons and aromatic hydrocarbons from the surface of the carbon particles. An analysis using gas heated at 300° C. shows that the gas evolved by heating the carbon particles at 300° C. after the oxidation treatment contains almost no lipophilic aliphatic hydrocarbons such as alkanes and alkenes or lipophilic aromatic hydrocarbons such as alkylbenzenes. Even when the carbon particles after the oxidation treatment contain a small amount of aliphatic hydrocarbons or aromatic hydrocarbons, the carbon particles can be uniformly dispersed in the silver-plating solution used in the present invention. However, it is preferred that the carbon particles contain no hydrocarbons with a molecular weight of 160 or more, and that the intensity of the gas evolved by heating the carbon particles with a molecular weight of less than 160 at 300° C. (purge-and-trap gas chromatography mass spectrometry intensity) is 5,000,000 or less.

Furthermore, from the viewpoints of wear resistance and heat resistance of the composite material obtained by forming the composite film on the base material using the silver-plating solution and because of the limitation on the carbon particles which can be introduced in the composite film, an amount of the carbon particles in the silver-plating solution is preferably 10 to 100 g/L, more preferably 15 to 90 g/L, and most preferably 20 to 70 g/L.

(Sb (Antimony))

The silver-plating solution used in the present invention preferably contains substantially no Sb. Specifically, the content of Sb in the silver-plating solution is 1 g/L or less, preferably 0.5 g/L or less, more preferably 0.1 g/L or less, and still more preferably 0.05 g/L or less.

As described in [Problem to be solved by the Invention] and [Means for Solving the Problem], when electroplating is performed using the silver-plating solution containing Sb, a composite film (AgSb layer) with small crystallite size and somewhat good wear resistance can be formed, but the composite film has a problem in terms of heat resistance. As in the technology disclosed in Patent Document 3, it is conceivable to improve the insufficient properties to some extent with a laminated configuration including an AgSb layer and another silver-plating layer. However, in terms of production cost, a single layer configuration is preferred.

On the other hand, the present invention uses a silver-plating solution containing the above-described compound A and carbon particles, so that (a composite material including) a composite film having small crystallite size and excellent wear resistance can be formed, thereby attaining both wear resistance and heat resistance, even when the silver-plating solution does not contain Sb.

(Complexing Agent)

The silver-plating solution used in the present invention preferably contains a complexing agent. The complexing agent complexes silver ions in the silver-plating solution to enhance their stability as ions. This action increases the solubility of silver in the solvent that constitutes the plating solution.

Although a wide variety of complexing agents with the above-described functions can be used, a compounds having a sulfonate group is preferred from the viewpoint of stability of the complex to be formed. Examples of the compound having a sulfonate group include $C_{1-12}$ alkyl sulfonic acids, $C_{1-12}$ alkanol sulfonic acids, and hydroxyaryl sulfonic acids. Specific examples of these compounds include methanesulfonic acid, 2-propanolsulfonic acid, and phenolsulfonic acid.

An amount of the complexing agent in the silver-plating solution is preferably from 30 to 200 g/L, and more preferably from 50 to 120 g/L, from the viewpoint of stabilization of silver ions.

(Other Additives)

The silver-plating solution used in the present invention may contain other additives such as gloss agents, curing agents, or electrical conductivity salts. Examples of the curing agent include carbon sulfide compounds (e.g., carbon disulfide), inorganic sulfur compounds (e.g., sodium thiosulfate), organic compounds (sulfonates), selenium compounds, tellurium compounds, and Group 4B or 5B metal in the periodic table (excluding antimony). An example of the electrical conductivity salt is potassium hydroxide.

(Solvent)

The solvent that constitutes the silver-plating solution is mainly water. Water is preferable because of the solubility of the (complexed) silver ion, the solubility of other ingredients included in the plating solution, and low environmental burden. As the solvent, a mixed solvent of water and alcohol may be used.

(Cyanide)

The main components of the silver-plating solution used in the present invention are described above. The silver-plating solution typically contains substantially no cyanide (specifically, the content of the cyanide in the silver-plating solution is 1 mg/L or less). The cyanide is a compound containing a cyano group (—CN), and the cyanide can be quantified according to JIS K0102:2019. The cyanide is a substance subject to the Water Pollution Control Act (effluent standard) and PRTR (Pollutant Release and Transfer Register) system, and involves high cost for wastewater treatment. The silver-plating solution used in the present invention typically contains substantially no cyanide as described above, and involves low cost for wastewater treatment.

<Electroplating Conditions>

Next, various conditions for electroplating using the silver-plating solution described above will be explained. For example, by electroplating described below, metallic silver is deposited on the base material while carbon particles get caught in the silver matrix, forming a composite film. In addition, due to the function of the compound A, the crystallite size of silver in the composite film is kept small. Furthermore, since the silver-plating solution contains substantially no Sb (content is 1 g/L or less), the formed composite film also contains substantially no Sb (content is 1 mass % or less). As a result, a composite material obtained by an embodiment of the method for producing a composite material of the present invention is excellent in wear resistance and heat resistance.

(Cathode and Anode)

A base material to be electroplated is a cathode. An anode is, for example, a silver electrode plate that dissolves to provide silver ions.

(Current Density)

The cathode and anode are immersed in the silver-plating solution (plating bath), and an electric current is applied for silver plating. The current density used herein is preferably 0.5 to 10 A/dm$^2$, more preferably 1 to 8 A/dm$^2$, and still more preferably 1.5 to 6 A/dm$^2$ from the viewpoint of the formation rate of the composite film and the suppression of uneven appearance of the composite film.

(Temperature, Stirring, Plating Time, Area to be Plated)

The temperature (plating temperature) of the plating bath (silver-plating solution) during electroplating is preferably 15 to 50° C., and more preferably 20 to 45° C. from the viewpoints of the production efficiency of the plating and the prevention of excessive evaporation of the solution. Stirring of the plating bath at that time is preferably 200 to 550 rpm, and more preferably 350 to 500 rpm from the viewpoint of performing uniform plating. Silver plating time (time period during which current is applied) can be appropriately adjusted according to the desired thickness of the composite film, and typically ranges from 25 to 1800 seconds. The area to be plated may be an entire surface layer of the base material, or may be a part of the surface of the base material, depending on the application of the composite material to be produced.

<<Formation of Ground Layer>>

In the method for producing a composite material of the present invention, a ground layer may be formed on the base material, and the ground layer may be subjected to electroplating described above. The ground layer is formed for the purpose of preventing the copper in the base material from diffusing to the plated surface to oxidize, thereby deteriorating the heat resistance of the composite material, or for the purpose of improving the adhesion of the composite film. Examples of a constituent metal of the ground layer include Cu, Ni, Sn, and Ag. The ground layer may be a layer consisting of Cu, Ni, Sn, or Ag, or a layer (having a laminated structure) combining them. Formation of the ground layer may be over an entire or a part of the surface of the base material, depending on the application of the composite material to be produced.

The method for forming the ground layer is not particularly limited. The ground layer can be formed by electroplating by a known method using the plating solution containing ions of the constituent metals described above. The above-described plating solution preferably contains substantially no cyanide from the viewpoint of the cost for wastewater treatment.

<<Ag Strike Plating>>

It is preferable to form a very thin intermediate layer by Ag strike plating to enhance the adhesion between the base material and the composite film before forming the composite film on the base material. When the ground layer is formed on the base material, Ag strike plating is performed on the ground layer. As a method for performing the Ag strike plating, conventionally known methods can be employed without particular limitation as long as the effects of the present invention are not impaired. A plating solution used for the Ag strike plating preferably contains substantially no cyanide from the viewpoint of the cost for wastewater treatment.

[Composite Material]

An embodiment of the composite material of the present invention will be hereinafter described. The composite material is a composite material including a composite film formed on a base material, the composite film containing carbon particles in a silver layer, wherein a content of Sb in the composite film is 1 mass % or less, and a crystallite size of silver in the composite film is 40 nm or less. The composite material can be produced, for example, by the method for producing a composite material of the present invention. Each configuration of the composite material will be described below.

<<Base Material>>

The above-described base materials are similar to the base materials described above for the method for producing a composite material of the present invention. In other words, Cu (copper) and a Cu alloy are suitable as the constituent material of the base material. As the Cu alloys, alloys constituted by Cu, at least one selected form the group consisting of Si (silicon), Fe(iron), Mg (magnesium), P (phosphorus), Ni (nickel), Sn (tin), Co (cobalt), Zn (zinc), Be (beryllium), Pb (lead), Te (tellurium), Ag (silver), Zr (zirconium), Cr (chromium), Al (aluminum), and Ti (titanium), and inevitable impurities are preferred from a viewpoint of compatibility between electrical conductivity and wear resistance.

<<Composite Film>>

The composite film formed on the base material includes a silver layer containing carbon particles. In the silver layer, the carbon particles are dispersed in a matrix consisting of silver (preferably in an approximately even manner). When the Ag strike plating is performed before the composite film is formed, an intermediate layer formed by the Ag strike plating exists between the base material (or the ground layer described below) and the composite film, the intermediate layer being often too thin to be distinguishable from the composite film. The composite film may be formed on an entire or part of the surface layer of the base material.

<Carbon Particles>

The above-described carbon particles are similar to the carbon particles described above for the method for producing a composite material of the present invention. That is, the carbon particles are preferably graphite particles, and the shape of the carbon particle is not particularly limited, and includes approximately spherical, scale-like, and irregular shapes, but is preferably scale-like shape because the composite film surface can be smoothened, thereby enhancing the wear resistance of the composite material.

An average primary particle size of the carbon particles is preferably 0.5 to 15 μm, and more preferably 1 to 10 μm from the viewpoint of wear resistance of the composite material. The average primary particle size is an average value of the long diameter of the particles, the long diameter being defined as the longest line segment that can be drawn in the particle in the image (two dimensional) of the particles in the composite film of the composite material observed at an appropriate observation magnification. The long diameter is determined for 50 or more particles.

<Antimony (Sb)>

The composite film contains substantially no Sb. Specifically, the content of Sb in the composite film is 1 mass % or less, and from the viewpoint of heat resistance of the composite material, preferably 0.5 mass % or less, more preferably 0.1 mass % or less, and still more preferably 500 ppm or less. Details of a method for measuring the content of Sb in the composite film will be described in Examples. The low content of Sb in the composite film is also considered to contribute to the excellent wear resistance of the composite material, although the reason is not clear.

<Crystallite Size and Vickers Hardness>

The crystallite size of silver in the composite film in the embodiment of the composite material of the present invention is as small as 40 nm or less. Since the crystallite size is small as described above, hardness of the composite film is high due to the Hall-Petch relationship (in general, metal material with smaller crystal grains has higher strength). High hardness makes the composite film less likely to be scraped and increases wear resistance of the composite material. The crystallite size is preferably 2 to 30 nm, and more preferably 2 to 20 nm, from the viewpoint of wear resistance.

In the present invention, as the crystallite size of silver, a value obtained by averaging the crystallite sizes of (111) and (222) (dividing the sum by 2) is employed to reduce bias due to the crystal planes. A more detailed method for measuring the crystallite size will be described in Examples.

As described above, since the composite film has small crystallite size, hardness is high. Specifically, the Vickers hardness Hv (unit: $kgf/mm^2$) is preferably 100 or more, and more preferably 120 to 230. Details of a method for measuring the Vickers hardness Hv will be explained in Examples.

<Content and Area Ratio of Carbon>

The composite film in an embodiment of the composite material of the present invention contains carbon particles as described above. The content of carbon in the composite film is preferably 1 to 50 mass %, more preferably 1.5 to 40 mass %, and still more preferably 2 to 35 mass %, from the viewpoint of wear resistance and electrical conductivity of the composite material. Furthermore, considering heat resistance, the content of carbon in the composite film is particularly preferably 2 to 30 mass %. Details of a method for measuring the content of carbon in the composite film will be described in Examples.

The percentage (area ratio) of the surface of the composite film containing carbon particles occupied by the carbon particles is an index of wear resistance, and preferably 1 to 80 area %, more preferably 1.5 to 80 area %, and still more preferably 2 to 80 area %, from the viewpoint of the balance between wear resistance and electrical conductivity. Details of a method for measuring the area ratio will be described in Examples.

<Total Content of Silver and Carbon>

Typically, the elemental composition of the composite film in an embodiment of the composite material of the present invention substantially consists of silver and carbon. Specifically, the total content of these elements in the composite film is 99 mass % or more, and more preferably 99.5 mass % or more.

<Thickness of Composite Film>

The thickness of the composite film is not particularly limited, but the composite film preferably has a minimum required thickness. When the thickness is too large, the effect of the composite film will be saturated, which increases the cost of raw materials. From the viewpoints described above, the thickness of the composite film is preferably 0.5 to 45 μm, more preferably 0.5 to 35 μm, and still more preferably 1 to 20 μm. Details of a method for measuring the thickness of the composite film will be described in Examples.

<<Ground Layer>>

A ground layer may be formed between the base material and the composite film for various purposes. Examples of the constituent metal of the ground layer include Cu, Ni, Sn, and Ag. For example, for the purpose of preventing copper in the base material from diffusing to the composite film surface to deteriorate heat resistance, it is preferable to form a ground layer consisting of Ni. For the purpose of preventing zinc in the base material from diffusing to the composite film surface when the base material is made of a copper alloy containing zinc such as brass, it is preferable to form a ground layer consisting of Cu. For the purpose of improving the adhesion of the composite film to the base material, it is preferable to form a ground layer consisting of Ag. The thickness of the ground layer is not particularly limited, but from the viewpoint of developing its function and cost, preferably 0.1 to 2 μm, and more preferably 0.2 to 1.5 μm. Moreover, Sn-plated or reflow Sn-plated material including Cu ground and Ni ground (laminated structure including Cu ground, Ni ground, and Sn ground, from the base material side) is often used for terminals of electrical and electronic parts. A ground layer having such a laminated structure may be formed in the present invention as well. Therefore, in the present invention, the ground of the composite film may include layers each consisting of Cu, Ni, Sn, or Ag, or a layer (having a laminated structure) combining them. Alternatively, different layers may be formed at different positions. For example, a composite film specified in the present invention may be formed at an electric contact part of the base material (a ground layer may or may not be formed), and a reflow Sn-plated ground layer may be formed at an electric wire swaging part (the composite film is not formed).

[Terminal]

Because of its excellent wear resistance and heat resistance, the embodiment of the composite material of the present invention is suitable as a constituent material for terminals, especially terminals in electrical contact parts, such as switches and connectors, in which sliding occurs during their use.

EXAMPLES

Examples of a composite plated material and a production method thereof according to the present invention will be hereinafter described in detail.

<Preparation of Carbon Particles>

Eighty grams of scale-like graphite particles (PAG-3000 manufactured by Nippon Graphite Industries Co., Ltd.) with an average particle size of 4.8 μm were added as carbon particles to 1.4 L of pure water, and the liquid mixture was heated to 50° C. with stirring. The average particle size is a volume-based cumulative 50% particle size measured using a laser diffraction/scattering particle size distribution measuring device (MT3300 (LOW-WET MT3000II Mode) manufactured by MicrotracBEL Corp.). Next, 0.6 L of a 0.1 mol/L potassium persulfate aqueous solution as an oxidizing agent was gradually added dropwise to this liquid mixture, and the mixture was stirred for 2 hours for oxidation treatment, and then filtered using filter paper. The resulting solid was washed with water.

An analysis for evolved gas upon heating at 300° C. was performed on carbon particles before and after the oxidation treatment, using a purge and trapping gas chromatography mass spectrometry system (a system combining JHS-100 manufactured by Japan Analytical Industry Co., Ltd. as a thermal desorption device, and GCMS QP-5050A manufactured by SHIMADZU CORPORATION as a gas chromatography mass spectrometer). The results show that the above-described oxidation treatment removes lipophilic aliphatic hydrocarbons (such as nonane, decane, 3-methyl-2-heptene) and lipophilic aromatic hydrocarbons (such as xylene), attached to the carbon particles.

Example 1

<Ag Strike Plating>

A plate material consisting of a Cu—Ni—Sn—P alloy with a thickness of 0.2 mm (a plate material consisting of a copper alloy containing 1.0 mass % of Ni, 0.9 mass % of Sn, and 0.05 mass % of P, the balance being Cu and inevitable impurities) (NB109EH manufactured by DOWA METALTECH CO., LTD.) were prepared. A test piece of 1.0 cm-width and 4.0 cm-length was cut from the plate material, and subjected to a process for forming indent with an inner diameter of 1.0 mm (to be raised in a hemispheric form). Using the base material as a cathode and a titanium-platinum mesh electrode plate (a platinum-plated titanium mesh base material) as an anode, electroplating (Ag strike plating) was performed at current density of 5 $A/dm^2$ for 30 seconds in a sulfonic acid-based Ag strike plating solution (Dain Silver GPE-ST manufactured by Daiwa Fine Chemicals Co., Ltd.; containing substantially no cyanide; silver concentration, 3 g/L; methanesulfonic acid concentration, 42 g/L) containing methanesulfonic acid as a complexing agent.

<AgC Plating>

Carbon particles (graphite particles) which had been subjected to the above-described oxidation treatment were added to a sulfonic acid-based silver-plating solution (Dain Silver GPE-HB (containing a compound represented by the general formula (I) (referred to as compound A1); solvent, mainly water) manufactured by Daiwa Fine Chemicals Co., Ltd.) which contains methanesulfonic acid as a complexing agent, and has silver concentration of 30 g/L and methanesulfonic acid concentration of 60 g/L, to prepare a carbon particles-containing sulfonic acid-based silver-plating solution containing carbon particles at the concentration of 30 g/L, silver at the concentration of 30 g/L, and methanesulfonic acid at the concentration of 60 g/L. The silver-plating solution contains substantially no Sb nor cyanide.

Next, using the above-described Ag strike plated base material as a cathode, and a silver electrode plate as an anode, electroplating was performed in the above-described sulfonic acid-based silver-plating solution containing carbon particles at the temperature of 25° C. and the current density of 2 $A/dm^2$ for 325 seconds while stirring at 400 rpm with a stirrer, to obtain a composite material (indented test piece) including a composite film (AgC plating film) formed on a base material, the composite film containing carbon particles in a silver layer. The composite film was formed on the entire surface of the base material.

The conditions for producing the composite material described above are summarized in Table 1 shown below, along with the production conditions and the like for Examples 2 to 7 and Comparative Examples 1 to 4 described below.

The following evaluations were performed on the obtained composite materials.

<Thickness of Composite Film>

The thickness of (a circular area with a diameter of 0.2 mm in the central part of the plane of 1.0 cm-width and 4.0 cm-length of) the composite film was measured to be 9.0 μm with a fluorescent X-ray film thickness gauge (FT9450 manufactured by Hitachi High-Tech Science Corporation). The thickness is determined by detecting Ag atoms because it is difficult to detect C atoms (of the carbon particles) with the fluorescent X-ray film thickness gauge. In the present invention, the thickness obtained in this way approximates the thickness of the composite film.

<Amounts of Ag, Sb, and C>

Using a tabletop microscope (TM4000 Plus manufactured by Hitachi High-Technologies) which is an electron microscope, the composite film was observed at 1000-times magnification and an accelerating voltage of 15 kV. In this observed area (one field), EDX analysis was performed using an energy dispersion type X-ray analyzer (AztecOne manufactured by Oxford Instruments) attached to the tabletop microscope. Ag and C were detected from the composite film of the composite material obtained in Example 1 (also, Ag and C were detected from the composite film of the composite material obtained in Examples 2 to 7 and Comparative Example 3 described below, Ag was detected from the silver plating film of the silver plated material obtained in Comparative Example 1 described below, Ag and Sb were detected in the composite film of the composite material obtained in Comparative Example 2 described below, and Ag, Sb, and C were detected from the composite film of the composite material obtained in Comparative Example 4 described below). The amounts of Ag (mass %), Sb (mass %), and C (mass %) measured by EDX analysis were taken as the contents of Ag, Sb, and carbon in the composite film, respectively. As a result, Ag content was 73.6 mass %, Sb content was 0.0 mass % (not detected), and carbon content was 26.4 mass %, in the composite film of the composite material obtained in Example 1.

<Crystallite Size of Silver of Composite Film>

X-ray diffraction measurement (Cu Kα radiation bulb, tube voltage: 30 kV, tube current: 10 mA, step width: 0.02°, scanning field: 2θ=10° to 154°, scanning speed: 10°/min, measuring time: approx. 15 minutes, (111) peak: 2θ=37.9 to 38.7°, (222) peak: 2θ=79 to 82.2°) was performed on the surface of the composite film using an X-ray diffractometer (D2 Phaser 2nd Generation manufactured by Bruker Japan K.K.) according to JIS H7805:2005. Full Width at Half Maximum (FWHM) was determined from the detected (111) and (222) peaks of silver using an X-ray analysis software (PDXL created by Rigaku Corporation), and a crystallite size was calculated on each crystal plane of silver according to Scherrer equation. In order to reduce the bias due to the crystal plane, the average crystallite size of (111) and (222) of silver was taken as the crystallite size of silver. The crystallite size was 11.6 nm.

The Scherrer equation is as follows.

$$D=K\cdot\lambda/\beta\cdot\cos\theta$$

D: Crystallite size

K: Scherrer constant, defined as 0.9

λ: X-ray wavelength, 1.54 Å for CuKα ray

β: Full Width at Half Maximum (FWHM) (rad)

θ: Measured angle (deg)

<Area Ratio of Carbon on Composite Film Surface>

The binarization of a backscattered electron compositional (COMPO) image (one field) of the surface of the composite film, obtained by observation of the surface of the composite film which was magnified 1000 times using a tabletop microscope (TM4000 Plus manufactured by Hitachi High-Tech Corporation) at an acceleration voltage of 5 kV, was performed using GIMP 2.10.10 (image analysis software), and the ratio of an area occupied by carbon on the composite film surface was calculated. Specifically, the binarization of the tone was performed so that the pixels having brightness of 127 or less were black while the pixels having brightness of more than 127 were white assuming that the highest brightness of all of the pixels was 255 and that the lowest brightness thereof was 0, then the image was divided into portions of silver (white portions) and portions of the carbon particles (black portions), and a ratio Y/X was calculated as an area ratio of carbon (%), where Y indicates the number of pixels in the area of carbon particles, and X indicates the number of pixels in the whole image. The area ratio of carbon was 40%.

<Average Primary Particle Size of Carbon Particles>

The composite material was cut into 1.0 cm×1.0 cm squares, and their edge faces were processed using an ion milling equipment (Cross-section Polisher IB-19530CP manufactured by JEOL Ltd.) at 4.0 kV for 5 hours. The obtained cross-sectional sample including a cross-section of the composite film was observed using a Schottky Field Emission type electron microscope (JSM-7200F manufactured by JEOL Ltd.) at 3000-times magnification and an accelerating voltage of 15 kV. The average primary particle size of the carbon particles in the composite film was obtained as the average of the long diameters determined for 78 carbon particles in the SEM image. As a result, the average primary particle size was 1.6 μm.

<Vickers Hardness Hv of Composite Film Surface>

The Vickers hardness Hv of the composite film surface was measured by applying a load of 0.01 N to a flat part of the composite material for 15 seconds using a microhardness tester (HM221 manufactured by Mitutoyo Corporation) according to JIS Z2244, and the average value of three measurements was adopted. As a result, the Vickers hardness Hv was 186.

<Evaluation of Wear Resistance>

A plated material obtained by subjecting the same Cu—Ni—Sn—P alloy plate material as that used in Example 1 to the same plating treatment (AgSb plating) as that in Comparative Example 2 described below was cut into flat plate-like test pieces of 2.0 cm-width and 3.0 cm-length. The thickness of the composite film (AgSb plating film) in the flat plate-like test piece was 20 μm.

Using a sliding wear tester (CRS-G2050-DWA manufactured by YAMASAKI SEIKI KENKYUSHO K.K), reciprocating sliding motion (sliding distance, 10 mm (i.e., 20 mm per one cycle of reciprocating motion); sliding speed, 3 mm/s) was continued on the flat plate-like test piece while the composite material was pressed against the test piece with a constant load (2 N) applied thereto, so that a convex part of the composite material (indented test piece (indenter)), obtained in Example 1 described above, came into contact with the flat plate-like test piece, and a wear test for confirming wear status of the composite material and the flat plate-like test piece was performed to evaluate wear resistance. After 2000 cycles of reciprocating sliding motions, the center parts of the sliding scratches on the composite material and the flat plate-like test piece were observed with a microscope (VHX-1000 manufactured by KEYENCE CORPORATION) at a 200-times magnification. As a result, it was confirmed that the (brown) base material (alloy plate material) was not exposed from either sliding scratch, indicating that the composite material of Example 1 was excellent in wear resistance.

<Evaluation of Heat Resistance>

(Contact Resistance after Storage at High Temperature)

The base materials of 2.0 cm-width and 3.0 cm-length were cut out from the same Cu—Ni—Sn—P alloy plate material as that used in Example 1, and subjected to Ag strike plating and AgC plating under the same conditions as those in Example 1 to obtain a composite material (flat plate-like test piece). The flat plate-like test piece was placed on the sliding wear tester, the indented test piece (AgSb plated) obtained in Comparative Example 2 described below was pressed with a constant load (2 N) while contact resistance was measured according to 4-terminal method. As a result, contact resistance was 1.0 mΩ.

In addition, the flat plate-like test piece was stored at 200° C. for 500 hours in an atmospheric air environment. Thereafter, the contact resistance measured in the same manner as described above was 0.9 mΩ.

The evaluation results described above are summarized in Table 2 shown below, along with the evaluation results for Examples 2 to 7 and Comparative Examples 1 to 4 described below.

Example 2

Using the base material similar to that in Example 1 as a cathode and a Ni electrode plate as an anode, electroplating (Ni plating) was performed for 28 seconds in a nickel plating bath (aqueous solution) consisting of nickel sulfamate at a concentration of 342 g/L (Ni concentration, 80 g/L) and boric acid at a concentration of 45 g/L, at a liquid temperature of 55° C. and a current density of 4 $A/dm^2$ with stirring to form a Ni film (Ni ground layer) having a thickness of 0.2 μm on the base material. The thickness of the ground layer was measured using the method similar to that used to determine the thickness of the composite film.

The composite material was prepared in the same manner as in Example 1, except that the plating time for AgC plating was 375 seconds and the base material including a Ni ground layer formed thereon was subjected to Ag strike plating.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below. For evaluation of heat resistance, the base materials of 2.0 cm-width and 3.0 cm-length were cut out from the same Cu—Ni—Sn—P alloy plate material as that used in Example 1, and Ag strike plating and AgC plating were performed under the same conditions as those in Example 2 to obtain a composite material (flat plate-like test piece). The same applies to Example 3 and subsequent Examples described below. For example, in Example 5, the base materials were cut out from the same alloy plate material as that used in Example 1, and Ag strike plating and the like were performed under the same conditions as those in Example 5 to obtain a composite material (flat plate-like test piece).

Example 3

A composite material was prepared in the same manner as in Example 2, except that the plating time for AgC plating was 38 seconds and the plating time for Ni plating (ground layer) was 70 seconds (as a result, a Ni ground layer having a thickness of 0.5 μm was formed).

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below.

Example 4

A composite material was prepared in the same manner as in Example 1, except that the stirring speed during the AgC plating was 250 rpm, the plating time was 1300 seconds, and the concentration of carbon particles in the plating solution used for AgC plating was 10 g/L.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below.

Example 5

A composite material was prepared in the same manner as in Example 1, except that the current density for AgC plating was 3 $A/dm^2$ and plating time was 300 seconds.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below.

Example 6

A composite material was prepared in the same manner as in Example 1, except that the plating time for AgC plating was 400 seconds, and the concentration of carbon particles in the plating solution used for AgC plating was 50 g/L.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below.

Example 7

A composite material including a composite film formed on a base material was produced in the same manner as in Example 1, except that a solution obtained by adding 2,4-dihydroxybenzoic acid (a compound represented by the general formula (I), referred to as a compound A2) to a sulfonic acid-based silver-plating solution (Dain Silver GPE-PL (not containing a compound A1 represented by the general formula (I); solvent, water) manufactured by Daiwa Fine Chemicals Co., Ltd.) having a silver concentration of 30 g/L containing methanesulfonic acid as a complexing agent at a concentration of 60 g/L was used in place of the sulfonic acid-based silver-plating solution in Example 1, carbon particles (graphite particles) which had been subjected to the same oxidation treatment as that in Example 1 were added thereto to the concentration of 50 g/L, and AgC plating was performed using the obtained sulfonic acid-based silver-plating solution containing carbon particles at the current density of 1 A/$dm^2$ for the plating time of 750 seconds. The concentration of 2,4-dihydroxybenzoic acid in the sulfonic acid-based silver-plating solution containing carbon particles described above was 5 g/L.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below.

Comparative Example 1

A silver plated material including a silver plating film formed on a base material was produced in the same manner as in Example 1, except that a sulfonic acid-based silver-plating solution (Dain Silver GPE-HB (containing a compound A1 represented by the general formula (I); solvent, mainly water) manufactured by Daiwa Fine Chemicals Co., Ltd.) having an Ag concentration of 30 g/L containing methanesulfonic acid as a complexing agent at the concentration of 60 g/L was used in place of the sulfonic acid-based silver-plating solution containing carbon particles to perform Ag plating, the current density for the Ag plating was 3 A/$dm^2$, and the plating time was 120 seconds.

In the same manner as in Example 1, the obtained silver plated material was evaluated for the thickness of the silver plating film, amounts of Ag, Sb, and C, crystallite size of silver in the composite film, area ratio of carbon on the silver plating film surface, Vickers hardness of the silver plating film surface, wear resistance, and heat resistance. The evaluation results are summarized in Table 2 below. During the wear test, the coefficient of friction increased sharply during the test after 170 sliding cycles, so the test was discontinued. The center parts of the sliding scratches on the composite material and the flat plate-like test piece were observed in the same manner as in Example 1. As a result, it was confirmed that the (brown) base material (alloy plate material) was exposed from both sliding scratches.

Comparative Example 2

<Ag Strike Plating>

A base material similar to that in Example 1 was prepared. Electroplating (Ag strike plating) was performed in a cyanide-based Ag strike plating solution containing cyanide as a complexing agent (initial make-up of electrolytic bath using general reagents; silver cyanide concentration, 3 g/L; potassium cyanide concentration, 90 g/L; solvent, water) at the current density of 5 A/$dm^2$ for 30 seconds using the base material (which is a platinum-plated titanium mesh base material) as a cathode, and titanium platinum mesh electrode plate as an anode.

<AgSb Plating>

A cyanide-based Ag—Sb alloy plating solution (solvent: water) containing cyanide as a complexing agent and having a silver concentration of 60 g/L and an antimony (Sb) concentration of 2.5 g/L was prepared. The above-described cyanide-based Ag—Sb alloy plating solution contains 10 mass % of silver cyanide, 30 mass % of sodium cyanide, and Nissin Bright N (manufactured by NISSIN KASEI CO., LTD.), and the concentration of Nissin Bright N in the above-described plating solution is 50 mL/L. Nissin Bright N contains a gloss agent and diantimony trioxide, and the concentration of diantimony trioxide in Nissin Bright N is 6 mass %.

Next, the above-described Ag strike plated base material was used as a cathode, and a silver electrode plate was used as an anode to perform electroplating in the above-described cyanide-based Ag—Sb alloy plating solution at the temperature of 18° C. and the current density of 3 A/$dm^2$ for 530 seconds while stirring at 400 rpm with a stirrer, thereby providing a composite material including a composite film (silver-antimony film) formed on a base material.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below. During the wear test, the test was halted once when the number of the sliding cycles reached 1000 to check the condition of the composite material and the flat plate-like test piece. The center parts of the sliding scratches on the composite material and the flat plate-like test piece were observed in the same manner as in Example 1. As a result, it was confirmed that the (brown) base material (alloy plate material) was exposed from both sliding scratches.

Comparative Example 3

A composite material including a composite film formed on a base material was produced in the same manner as in Example 1, except that a sulfonic acid-based silver-plating solution (Dain Silver GPE-PL (not containing a compound A1 represented by the general formula (I); solvent, water) manufactured by Daiwa Fine Chemicals Co., Ltd.) having a silver concentration of 30 g/L and containing methanesulfonic acid as a complexing agent at a concentration of 60 g/L was used in place of the sulfonic acid-based silver-plating solution in Example 1, carbon particles (graphite particles) which had been subjected to the same oxidation treatment as that in Example 1 were added thereto, and AgC plating was performed using the obtained sulfonic acid-based silver-plating solution containing carbon particles at the current density of 3 A/$dm^2$ for the plating time of 160 seconds.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below. During the wear test, the coefficient of friction increased sharply during the test after 100 sliding cycles, so the test was discontinued. The center parts of the sliding scratches on the composite material and the flat plate-like test piece were observed in the same manner as in Example 1. As a result, it was confirmed that the (brown) base material (alloy plate material) was exposed from both sliding scratches.

Comparative Example 4

A composite material was produced in the same manner as in Comparative Example 2, except that a plating solution (concentration of carbon particles: 60 g/L) obtained by adding carbon particles (graphite particles) which had been subjected to the same oxidation treatment as that in Example 1 to cyanide-based Ag—Sb alloy plating solution used in Comparative Example 2 was used, the rotation speed was 250 rpm, the current density was 5 A/dm$^2$, and the plating time was 90 seconds.

In the same manner as in Example 1, the obtained composite material was evaluated for the thickness of the composite film, amounts of Ag, Sb, and C, crystallite size of silver in the composite film, area ratio of carbon on the composite film surface, Vickers hardness of the composite film surface, wear resistance, and heat resistance. The evaluation results are summarized in Table 2 below. In the wear resistance test, after 2000 cycles of reciprocating sliding motions, the center parts of the sliding scratches on the composite material and the flat plate-like test piece were observed in the same manner as in Example 1. As a result, it was confirmed that the (brown) base material (alloy plate material) was exposed from the sliding scratch of the flat plate-like test piece.

The conditions for producing the composite materials and the silver plated materials in Examples 1 to 7 and Comparative Examples 1 to 4 described above are summarized in Table 1 below, and the evaluation results are summarized in Table 2 below.

TABLE 1

| | | | | Example 1 | Example 2 | Example 3 | Example 4 | Example 5 | Example 6 |
|---|---|---|---|---|---|---|---|---|---|
| Ground layer | Main component of plating solution | | Nickel | — | 80 g/L | 80 g/L | — | — | — |
| | | | Complexing agent | | Boric acid 45 g/L | Boric acid 45 g/L | | | |
| | | | Cursent density | | 4 A/dm2 | 4 A/dm2 | | | |
| | | | Plating time | | 28 sec | 70 sec | | | |
| Strike plating | Main component of plating solution | | Silver ion | 3 g/L | 3 g/L | 3 g/L | 3 g/L | 3 g/L | 3 g/L |
| | | Complexing agent | Methanesulfonic acid | 42 g/L | 42 g/L | 42 g/L | 42 g/L | 42 g/L | 42 g/L |
| | | | Others | — | — | — | — | — | — |
| | | | Current density | 5 A/dm$^2$ | 5 A/dm$^2$ | 5 A/dm$^2$ | 5 A/dm$^2$ | 5 A/dm$^2$ | 5 A/dm$^2$ |
| | | | Plating time | 30 sec | 30 sec | 30 sec | 30 sec | 30 sec | 30 sec |
| Ag-based plating | Main component of plating solution | | Silver ion | 30 g/L | 30 g/L | 30 g/L | 30 g/L | 30 g/L | 30 g/L |
| | | | Compound A | A1 | A1 | A1 | A1 | A1 | A1 |
| | | Complexing agent | Methanesulfonic acid | 60 g/L | 60 g/L | 60 g/L | 60 g/L | 60 g/L | 60 g/L |
| | | | Others | — | — | — | — | — | — |
| | | | Additive | — | — | — | — | — | — |
| | | Carbon particles | Average particle size | 4.8 μm | 4.8 μm | 4.8 μm | 4.8 μm | 4.8 μm | 4.8 μm |
| | | | Concentration | 30 g/L | 30 g/L | 30 g/L | 10 g/L | 30 g/L | 50 g/L |
| | | | Sb Content | 0 g/L | 0 g/L | 0 g/L | 0 g/L | 0 g/L | 0 g/L |
| | | | Plating temperature | 25° C. | 25° C. | 25° C. | 25° C. | 25° C. | 25° C. |
| | | | Stirring | 400 rpm | 400 rpm | 400 rpm | 250 rpm | 400 rpm | 400 rpm |
| | | | Carrent density | 2 A/dm$^2$ | 2 A/dm$^2$ | 2 A/dm$^2$ | 2 A/dm$^2$ | 3 A/dm$^2$ | 2 A/dm$^2$ |
| | | | Plating time | 325 sec | 375 sec | 38 sec | 1300 sec | 300 sec | 400 sec |

| | | | | Example 7 | Com.Ex. 1 | Com.Ex. 2 | Com.Ex. 3 | Com.Ex. 4 |
|---|---|---|---|---|---|---|---|---|
| Ground layer | Main component of plating solution | | Nickel | — | — | — | — | — |
| | | | Complexing agent | | | | | |
| | | | Cursent density | | | | | |
| | | | Plating time | | | | | |
| Strike plating | Main component of plating solution | | Silver ion | 3 g/L | 3 g/L | 3 g/L (As Ag cyanide) | 3 g/L | 3 g/L (As Ag cyanide) |
| | | Complexing agent | Methanesulfonic acid | 42 g/L | 42 g/L | — | 42 g/L | — |
| | | | Others | — | — | Potassium cyanide 90 g/L | — | Potassium cyanide 90 g/L |
| | | | Current density | 5 A/dm$^2$ | 5 A/dm$^2$ | 5 A/dm$^2$ | 5 A/dm$^2$ | 5 A/dm$^2$ |
| | | | Plating time | 30 sec | 30 sec | 30 sec | 30 sec | 30 sec |
| Ag-based plating | Main component of plating solution | | Silver ion | 30 g/L | 30 g/L | 60 g/L | 30 g/L | 60 g/L |
| | | | Compound A | A2 | A1 | — | — | — |
| | | Complexing agent | Methanesulfonic acid | 60 g/L | 60 g/L | — | 60 g/L | — |
| | | | Others | — | — | Sodium cyanide | — | Sodum cyanide |
| | | | Additive | — | — | Nissin bright N 50 mL/L (containing diantimony trioxide) | — | Nissin bright N 50 mL/L (containing diantimony trioxide) |

TABLE 1-continued

| | | | | | | |
|---|---|---|---|---|---|---|
| Carbon particles | Average particle size | 4.8 µm | — | — | 4.8 µm | 4.8 µm |
| | Concentration | 50 g/L | | | 30 g/L | 60 g/L |
| Sb Content | | 0 g/L | 0 g/L | 2.5 g/L | 0 g/L | 25 g/L |
| Plating temperature | | 25° C. | 25° C. | 18° C. | 25° C. | 18° C. |
| Stirring | | 400 rpm | 400 rpm | 400 rpm | 400 rpm | 250 rpm |
| Current density | | 1 A/dm$^2$ | 3 A/dm$^2$ | 3 A/dm$^2$ | 3 A/dm$^2$ | 5 A/dm$^2$ |
| Plating time | | 750 sec | 120 sec | 530 sec | 180 sec | 90 sec |

Com.Ex. = Comparative Example

| | | Example 1 | Example 2 | Example 3 | Example 4 | Example 5 | Example 6 |
|---|---|---|---|---|---|---|---|
| | Ground layer | Absent | Ni Film (0.2 µm) | Ni Film (0.5 µm) | Absent | Absent | Absent |
| Film | Composition | AgC | AgC | AgC | AgC | AgC | AgC |
| | Ag Thickness | 9.0 µm | 10.3 µm | 1.0 µm | 36.0 µm | 12.4 µm | 11.3 µm |
| | Ag Content | 73.6 wt % | 74.4 wt % | 97.8 wt % | 97.2 wt % | 68.6 wt % | 58.2 wt % |
| | Sb Content | 0 wt % | 0 wt % | 0 wt % | 0 wt % | 0 wt % | 0 wt % |
| | C Content | 26.4 wt % | 25.6 wt % | 2.2 wt % | 2.8 wt % | 314 wt % | 41.8 wt % |
| | Vickers Hardness | 186 | 1 70 | 172 | 122 | 166 | 176 |
| | Crystallite size | 11.6 nm | 11.4 nm | 16.5 nm | 12.0 nm | 13.0 nm | 13.3 nm |
| | Area ratio of carbon on surface | 40.0% | 45.0% | 2.3% | 3.6% | 58.0% | 79.0% |
| | Average primary particle size of carbon particles | 1.6 µm | — | — | — | — | — |
| Wear resistance | Exposed base material on indented test piece's side | Not observed | Not observed | Not observed | Not observed | Not observed | Not observed |
| | Exposed base material on flat plate-like test piece's side | Not observed | Not observed | Not observed | Not observed | Not observed | Not observed |
| Heat resistance | Contact resistance before storage at high temperature | 1.0 mΩ | 1.1 mΩ | 1 7 mΩ | 1.1 mΩ | 0.8 mΩ | 1.5 mΩ |
| | Contact resistance after storage at high temperature | 0.9 mΩ | 1.0 mΩ | 1.8 mΩ | 0.9 mΩ | 1.1 mΩ | 1.6 mΩ |

| | | Example 7 | Com.Ex. 1 | Com.Ex 2 | Com Ex. 3 | Com.Ex 4 |
|---|---|---|---|---|---|---|
| | Ground layer | Absent | Absent | Absent | Absent | Absent |
| Film | Composition | AgC | Ag | AgSb | AgC | AgSbC |
| | Ag Thickness | 8.1 µm | 4.8 µm | 22.0 µm | 6.6 µm | 5.8 µm |
| | Ag Content | 96.0 wt % | 100.0 wt % | 98.0 wt % | 66.0 wt % | 88.2 wt % |
| | Sb Content | 0 wt % | 0 wt % | 2.0 wt % | 0 wt % | 1.6 wt % |
| | C Content | 4.0 wt % | 0 wt % | 0 wt % | 34.0 wt % | 10.2 wt % |
| | Vickers Hardness | 141 | 172 | 180 | 70 | 176 |
| | Crystallite size | 16.5 nm | 9.8 nm | 16.1 nm | 46.6 nm | 19.9 nm |
| | Area ratio of carbon on surface | 3.0% | 0.0% | 0.0% | 60.0% | 20.0% |
| | Average primary particle size of carbon particles | — | — | — | — | — |
| Wear resistance | Exposed base material on indented test piece's side | Not observed | Observed (170 cycles) | Observed (1000 cycles) | Observed (100 cycles) | Not observed |
| | Exposed base material on flat plate-like test piece's side | Net observed | Observed (170 cycles) | Observed (1000 cycles) | Observed (100 cycles) | Observed (2000 cycles) |
| Heat resistance | Contact resistance before storage at high temperature | 2.1 mΩ | 1.3 mΩ | 1.0 mΩ | 0.6 mΩ | 1.3 mΩ |
| | Contact resistance after storage at high temperature | 2.3 mΩ | 2.2 mΩ | 5.1 mΩ | 0.8 mΩ | 4.4 mΩ |

Com.Ex. = Comparative Example

Table 2 shows that in the evaluation of wear resistance, the AgSb alloy plating film of the flat plate-like test piece was peeled off to expose the base material in any of Comparative Examples 1 to 4. That is, the composite materials or the sliver plated materials in Comparative Examples 1 to 4 wore the opponent materials. Adhesion wear is considered as a mode of wear. It is considered that adhesion of silver is suppressed by the carbon particles in the composite film of the composite material in Examples. In contrast, it is considered that adhesion of silver occurred and led to wear in Comparative Examples 1 and 2. It is considered that in the composite material in Comparative Example 3, wear occurred because of the large crystallite size of silver in the composite film and low Vickers hardness Hv of the composite film. Furthermore, in Comparative Example 4, the composite film included silver of small crystallite size and carbon particles as in Examples, and the base material was not exposed in the indented test piece. However, perhaps because of Sb in the composite film, the AgSb alloy plating film was peeled off to expose the alloy plate material, in the flat plate-like test piece.

In addition, the composite material in Comparative Examples 2 and 4 had contact resistance more than 4 mΩ after storage at high temperature, indicating poor heat resistance.

The invention claimed is:

1. A composite material comprising a composite film formed on a base material, the composite film including a silver layer containing carbon particles, wherein a content of Sb in the composite film is 0.1 mass % or less, a crystallite size of silver in the composite film is 40 nm or less, and a thickness of the composite film is 0.5 to 20 μm.

2. The composite material according to claim 1, wherein a percentage of the surface of the composite film occupied by the carbon particles is 1 to 80 area %.

3. The composite material according to claim 1, wherein the crystallite size of silver in the composite film is 2 to 30 nm.

4. The composite material according to claim 1, wherein the base material is constituted by Cu or a Cu alloy.

5. The composite material according to claim 1, wherein the Vickers hardness Hv of the composite film is 100 or more.

6. The composite material according to claim 1, further comprising a ground layer formed between the base material and the composite film, the ground layer containing at least one metal selected from the group consisting of Cu, Ni, Sn, and Ag.

7. The composite material according to claim 6, wherein the ground layer contains Cu.

8. A terminal in which the composite material according to claim 1 is used as a constituent material thereof.

9. The composite material according to claim 1, wherein a content of carbon in the composite film is 1 to 50 mass %.

10. The composite material according to claim 9, wherein the content of carbon in the composite film is 25.6 to 50 mass %.

11. The composite material according to claim 10, wherein a percentage of the surface of the composite film occupied by the carbon particles is 1 to 80 area %.

12. The composite material according to claim 10, wherein the crystallite size of silver in the composite film is 2 to 30 nm.

13. The composite material according to claim 10, wherein the base material is constituted by Cu or a Cu alloy.

14. The composite material according to claim 10, wherein the Vickers hardness Hv of the composite film is 100 or more.

* * * * *